J. H. COFFEY, Jr. & J. H. COFFEY.
DEMOUNTABLE TIRE.
APPLICATION FILED APR. 22, 1915.
1,162,979.
Patented Dec. 7, 1915.
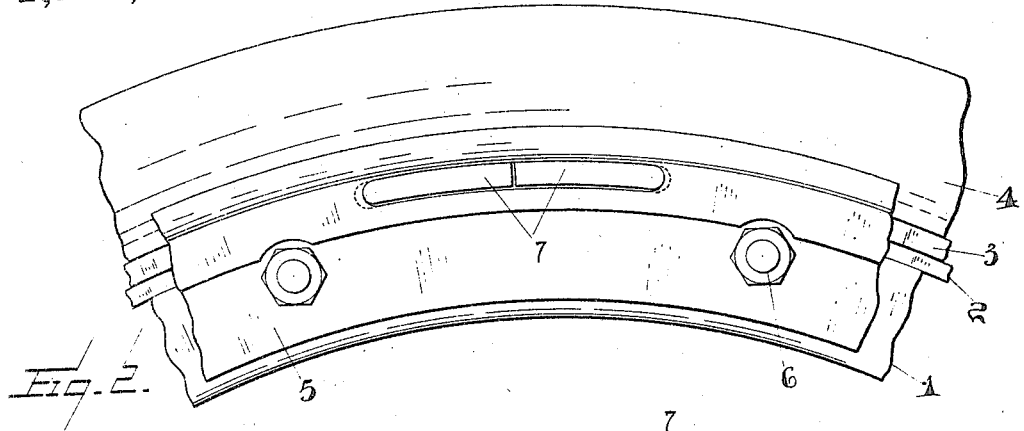
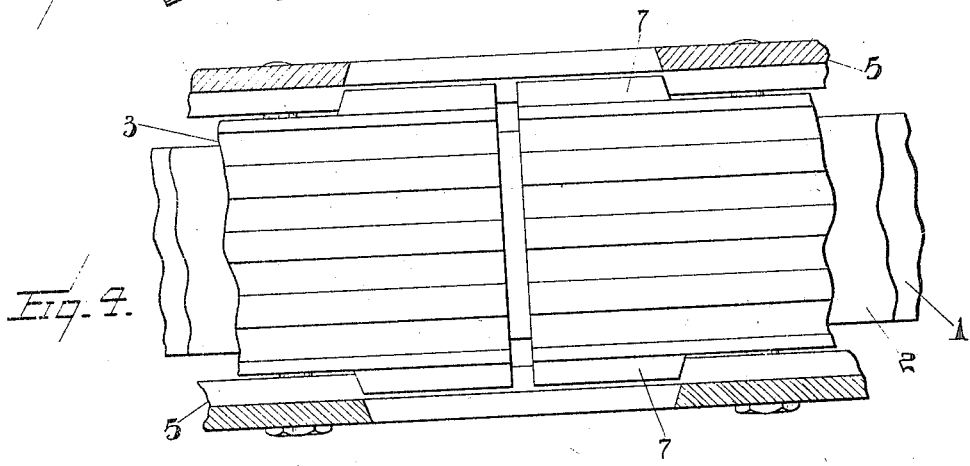
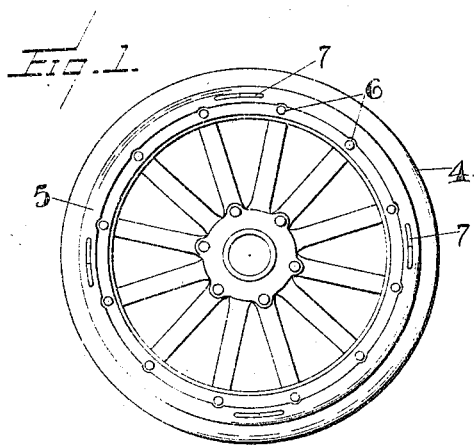
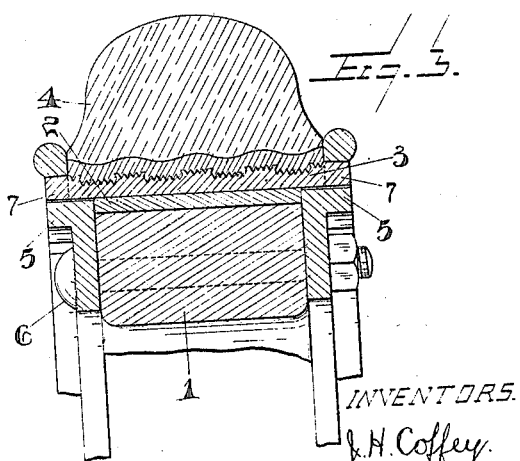
WITNESSES.
N. R. Tyndall
E. P. Hall
INVENTORS.
J. H. Coffey.
J. H. Coffey Jr.
By J. Edward Maybee
ATTY.

UNITED STATES PATENT OFFICE.

JOSEPH H. COFFEY, JR., AND JOSEPH H. COFFEY, OF TORONTO, ONTARIO, CANADA, ASSIGNORS OF ONE-HALF TO GUTTA PERCHA AND RUBBER, LIMITED, OF TORONTO, ONTARIO, CANADA.

DEMOUNTABLE TIRE.

1,162,979.  Specification of Letters Patent.  Patented Dec. 7, 1915.

Application filed April 22, 1915.  Serial No. 23,183.

*To all whom it may concern:*

Be it known that we, JOSEPH HERBERT COFFEY, Jr., and JOSEPH HERBERT COFFEY, of the city of Toronto, in the county of York, Province of Ontario, Canada, subjects of the King of Great Britain, have invented certain new and useful Improvements in Demountable Tires, of which the following is a specification.

This invention relates particularly to solid rubber truck tires in which the rubber tire is carried by an annular metal base, which it is required shall be adapted to be slipped on or off the wheel felly, and our object is to devise a construction which will enable the said annular base to be easily slipped on or off, and which will enable the said annular base to be tightly clamped on the felly when in position and securely held from creeping circumferentially.

We attain our object by radially dividing the annular tire base into a plurality of sections, and providing them with means engageable by side flanges to draw the said segments together circumferentially and thus tighten them on the felly.

This invention is hereinafter more specifically described and illustrated in the accompanying drawings in which—

Figure 1 is a side elevation of a wheel provided with our improved tire; Fig. 2 is a side elevation of part of the rim of the wheel provided with our improved tire; Fig. 3 a cross section of the same; and Fig. 4 a plan view partly in section with the rubber tire removed and the side flanges laterally displaced on the felly.

In the drawings like numerals of reference indicate corresponding parts in the different figures.

1 is the wooden felly and 2 the metal band secured to the outer periphery of the felly. 3 is the annular metal tire base on which is secured the solid rubber tire 4 in any ordinary manner. This annular tire base is of such a size as to slip easily over the felly band 2 and is radially divided, preferably at four different points as shown, so that it may be expanded and contracted circumferentially to tighten it on the felly band or to free it therefrom.

5—5 are side flanges adapted to be detachably connected with the sides of the felly by means of the bolts 6. Projection-and-slot connections are formed between said flanges and the annular tire base adapted, as the side flanges are drawn to place against the sides of the felly, to draw the tire base segments toward one another and thus clamp them on the wheel periphery. Preferably projections are formed on the tire base and the slots in the side flanges. A preferable arrangement is shown in the drawings, 7 being projections, which are located on each segment at each side of each slit at each side of the tire. Slots are formed in the side flanges each adapted to receive a pair of projections as shown particularly in Figs. 2 and 4. The projections and slots are so shaped that as the flanges are drawn inwardly against the felly, the tire base is contracted circumferentially. Preferably, the ends of the projections remote from the adjacent slit are beveled as shown, and the ends of the slot are preferably similarly inclined. The projections must fit the slots somewhat loosely radially of the tire in order to permit of the slight inward movement of the projections which takes place as the tire base is contracted on the felly band.

It will be understood that with this construction not only can the annular tire base be contracted on the felly after being placed in position, but that a creeping of the tire base on the felly is absolutely prevented by the engagement of the projections thereon with the slots in the side flanges, which themselves are securely bolted to the felly.

It should be noted that the slits between the segments of the annular tire base are of such width that they never quite close up so that we are assured that sufficient contraction of the said base will be provided for to permit of its being firmly clamped against the wheel periphery.

The mode of operation in mounting and demounting the tire will be readily understood from the above description.

What we claim as our invention is:—

1. A wheel felly in combination with an annular tire base formed in segments radially separated by slits but otherwise forming a continuous unbroken support for a tire; annular side flanges removably secured to opposite sides of the felly and overlapping the edges of the tire base; a projection on each segment at each side of each slit at each side of the tire, each having its end remote from the slit beveled, each side flange having slots cut therein adapted to engage said projections as the side flanges are drawn to place against the sides of the felly to draw the tire base segments toward one another and thus clamp them on the wheel periphery.

2. A wheel felly in combination with an annular tire base formed in radially separated segments but otherwise forming a continuous unbroken support for a tire; annular side flanges removably secured to opposite sides of the felly and overlapping the edges of the tire base; and projections formed on the tire base, slots being formed in the side flanges, and the projections and slots being adapted as, the side flanges are drawn to place against the sides of the felly to draw the tire base segments toward one another and thus clamp them on the wheel periphery.

Signed at Toronto, Canada, this 13th day of April, 1915, in the presence of the two undersigned witnesses.

JOSEPH H. COFFEY, Jr.
JOSEPH H. COFFEY.

Witnesses:
E. P. HALL,
A. M. LEWIS.